United States Patent
Kerselaers et al.

(10) Patent No.: US 10,491,270 B1
(45) Date of Patent: Nov. 26, 2019

(54) NEAR-FIELD DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/200,456

(22) Filed: Nov. 26, 2018

(51) Int. Cl.
*H04B 5/00* (2006.01)
*H01Q 7/00* (2006.01)

(52) U.S. Cl.
CPC ............. *H04B 5/0012* (2013.01); *H01Q 7/00* (2013.01)

(58) Field of Classification Search
CPC .................................................. H04B 5/0012
See application file for complete search history.

(56) References Cited

U.S. PATENT DOCUMENTS

| | | | |
|---|---|---|---|
| 9,351,100 B2 | 5/2016 | Tarnhed et al. | |
| 9,538,938 B2 | 1/2017 | Garcia Morchon et al. | |
| 10,277,267 B1* | 4/2019 | Kerselaers | H04B 1/40 |
| 10,277,284 B1* | 4/2019 | Kerselaers | H04B 5/0043 |
| 2010/0003917 A1* | 1/2010 | Hebiguchi | H04B 13/005 455/41.1 |
| 2011/0294420 A1* | 12/2011 | Hebiguchi | H04B 13/005 455/41.1 |
| 2012/0220227 A1* | 8/2012 | Dobyns | H04B 5/0031 455/41.1 |
| 2015/0118974 A1* | 4/2015 | Montgomery | H01Q 5/22 455/75 |

* cited by examiner

*Primary Examiner* — David Bilodeau

(57) ABSTRACT

One example discloses a near-field device, configured to receive a non-propagating quasi-static near-field signal from a near-field antenna, comprising: a tuning circuit including a set of impedance tuning banks; and a controller configured to, identify a set of impedance values for the impedance tuning banks corresponding to an initial resonance frequency, bandwidth and/or quality factor of the near-field antenna and near-field device combination; detect a change in the resonance frequency, bandwidth and/or quality factor; access a pre-stored set of specific resonance frequency, bandwidth and/or quality factor changes corresponding to a set of specific conductive structures; identify a conductive structure from the set of conductive structures corresponding to the detected change; access a pre-stored set of specific near-field device actions corresponding to the set of conductive structures; and effect a set of specific actions from the set of near-field device actions corresponding to the identified conductive structure.

17 Claims, 4 Drawing Sheets

NEAR-FIELD DEVICE

The present specification relates to systems, methods, apparatuses, devices, articles of manufacture and instructions for near-field communications.

SUMMARY

According to an example embodiment, a near-field device, configured to receive a non-propagating quasi-static near-field signal from a near-field antenna, comprising: a tuning circuit including a set of impedance tuning banks; and a controller configured to, identify a set of impedance values for the impedance tuning banks corresponding to an initial resonance frequency, bandwidth and/or quality factor of the near-field antenna and near-field device combination; detect a change in the resonance frequency, bandwidth and/or quality factor; access a pre-stored set of specific resonance frequency, bandwidth and/or quality factor changes corresponding to a set of specific conductive structures; identify a conductive structure from the set of conductive structures corresponding to the detected change; access a pre-stored set of specific near-field device actions corresponding to the set of conductive structures; and effect a set of specific actions from the set of near-field device actions corresponding to the identified conductive structure.

In another example embodiment, further comprising, adjusting the impedance tuning banks to a new set of impedance values that place the near-field antenna and near-field device combination back to the initial resonance frequency, bandwidth and/or quality factor values; and wherein the change in the resonance frequency, bandwidth and/or quality factor is defined as the new set of impedance values.

In another example embodiment, the set of impedances are capacitances.

In another example embodiment, the set of impedances are resistances.

In another example embodiment, the conductive structure is a magnetically conductive structure.

In another example embodiment, the conductive structure is an electrically conductive structure.

In another example embodiment, the device includes the conductive structure; the conductive structure is a first conductive structure; and the first conductive structure is galvanically connectable to a second conductive structure.

In another example embodiment, the conductive structure is or is embedded in at least one of: a human body, a wearable device, an internet of things device, a biometric device, a building structure, a safe, a pay terminal, an industrial machine, a clinical medical device, a personal health device, a food container, kitchen equipment, a home automation device, a vehicle steering wheel, and/or a vehicle seat or dashboard.

In another example embodiment, the near-field device is a near-field electromagnetic induction (NFEMI) device; and the near-field antenna is a near-field electromagnetic induction (NFEMI) antenna.

In another example embodiment, the near-field antenna and near-field device combination is configured to be less than 10 mm from the conductive structure.

In another example embodiment, the change corresponds to a static physical position of the combination with respect to the conductive structure; and the set of specific actions include, outputting a request that the physical position be changed.

In another example embodiment, the change corresponds to a varying physical position of the combination with respect to the conductive structure; and the set of specific actions include, outputting a physical position variance rate, duration, and/or variance range.

In another example embodiment, the change corresponds to contact with an access control conductive structure; and the set of specific actions include, providing access to at least one of: a building, a service, or information.

In another example embodiment, the change corresponds to a specific person's biometric signature with respect to the conductive structure; and the set of specific actions include, user identification, providing a good, or providing a service.

In another example embodiment, the change corresponds to a specific positioning of the conductive structure with respect to a set of additional conductive structures.

In another example embodiment, the device is embedded in at least one of: a wearable device, a hearing aid, an earbud, a smartwatch, a smartphone, or a medical monitoring device.

According to an example embodiment, a method of enabling a near-field device, that is configured to receive a non-propagating quasi-static near-field signal from a near-field antenna, to be operated, comprising: distributing a set of instructions, stored on a non-transitory, tangible computer readable storage medium, for configuring the near-field device; wherein the instructions include, identifying a set of impedance values for a set of impedance tuning banks corresponding to an initial resonance frequency, bandwidth and/or quality factor of the near-field antenna and near-field device combination; detecting a change in the resonance frequency, bandwidth and/or quality factor; accessing a pre-stored set of specific resonance frequency, bandwidth and/or quality factor changes corresponding to a set of specific conductive structures; identifying a conductive structure from the set of conductive structures corresponding to the detected change; accessing a pre-stored set of specific near-field device actions corresponding to the set of conductive structures; and effecting a set of specific actions from the set of near-field device actions corresponding to the identified conductive structure.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
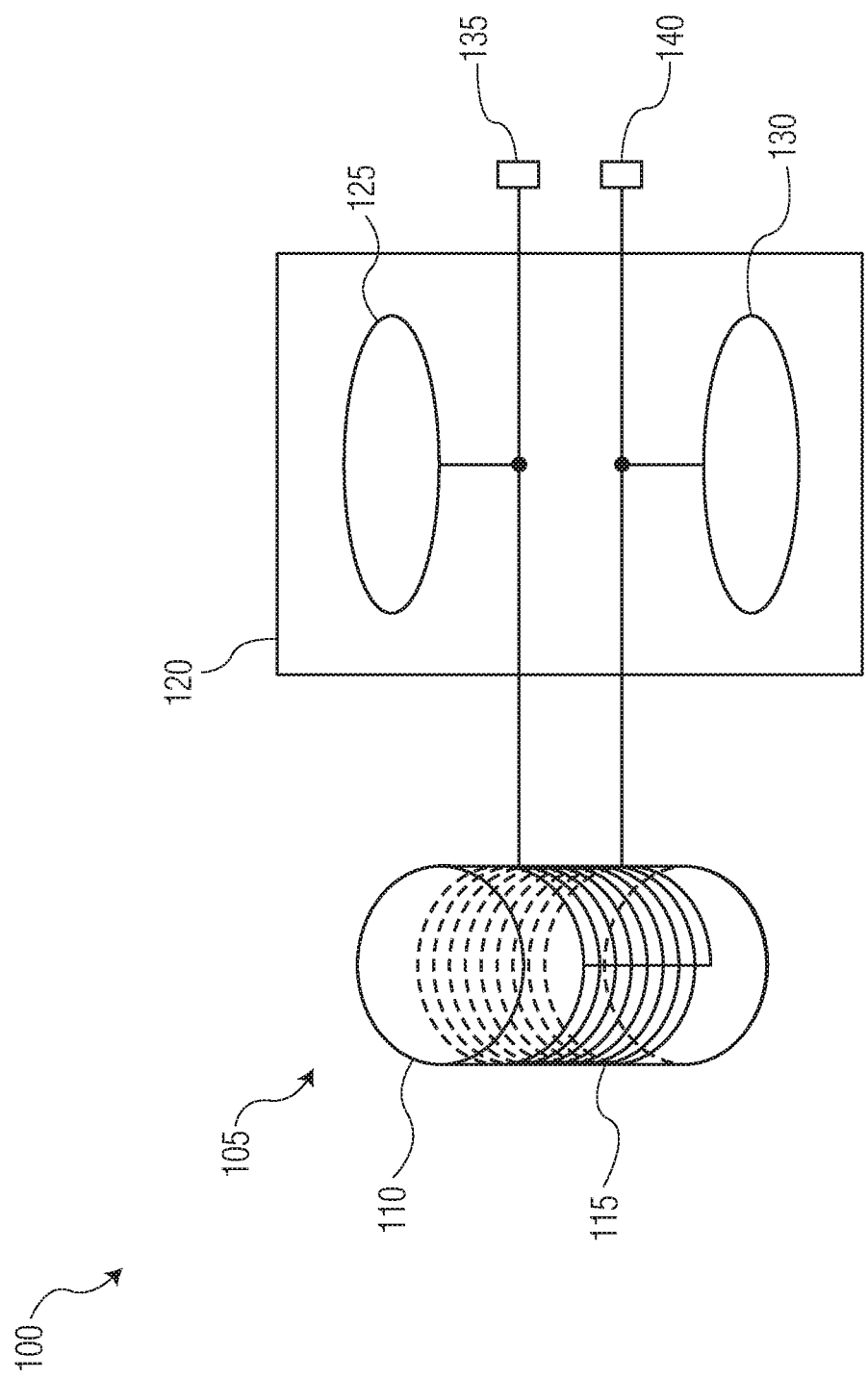
FIG. 1 is a first example near-field antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are body communication and other wireless networked devices based on near-field electromagnetic induction (NFEMI), where the transmitter and receiver are coupled by both magnetic (H) and electric (E) fields, on near-field magnetic induction (NFMI), where the transmitter and receiver are coupled by just magnetic (H) fields, or on near-field electric induction (NFEI), where the transmitter and receiver are coupled by just electric (E) fields. While RF wireless communication is accomplished by propagating an RF plane wave through free space, NFEMI and NFMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

FIG. 1 is an example near-field electromagnetic induction (NFEMI) antenna 100 for use in a wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include two loading plates 125 and 130. Antenna 100 feed points 135, 140 are coupled to various transceiver circuitry, such as downstream radio transmitter and receiver integrated circuit (RF-IC), (not shown here).

The short loaded dipole portion 120 is responsive to an electric (E) field. The coil antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced. The size of the coil antenna 105 and the transmit frequency are chosen to reduce any far field radiation that may be created by the coil antenna 105. For example, the size of the coil antenna 105 can be 2 mm in diameter and 6 mm in length and the transmit frequency kept below 50 MHz.

Figure 2:
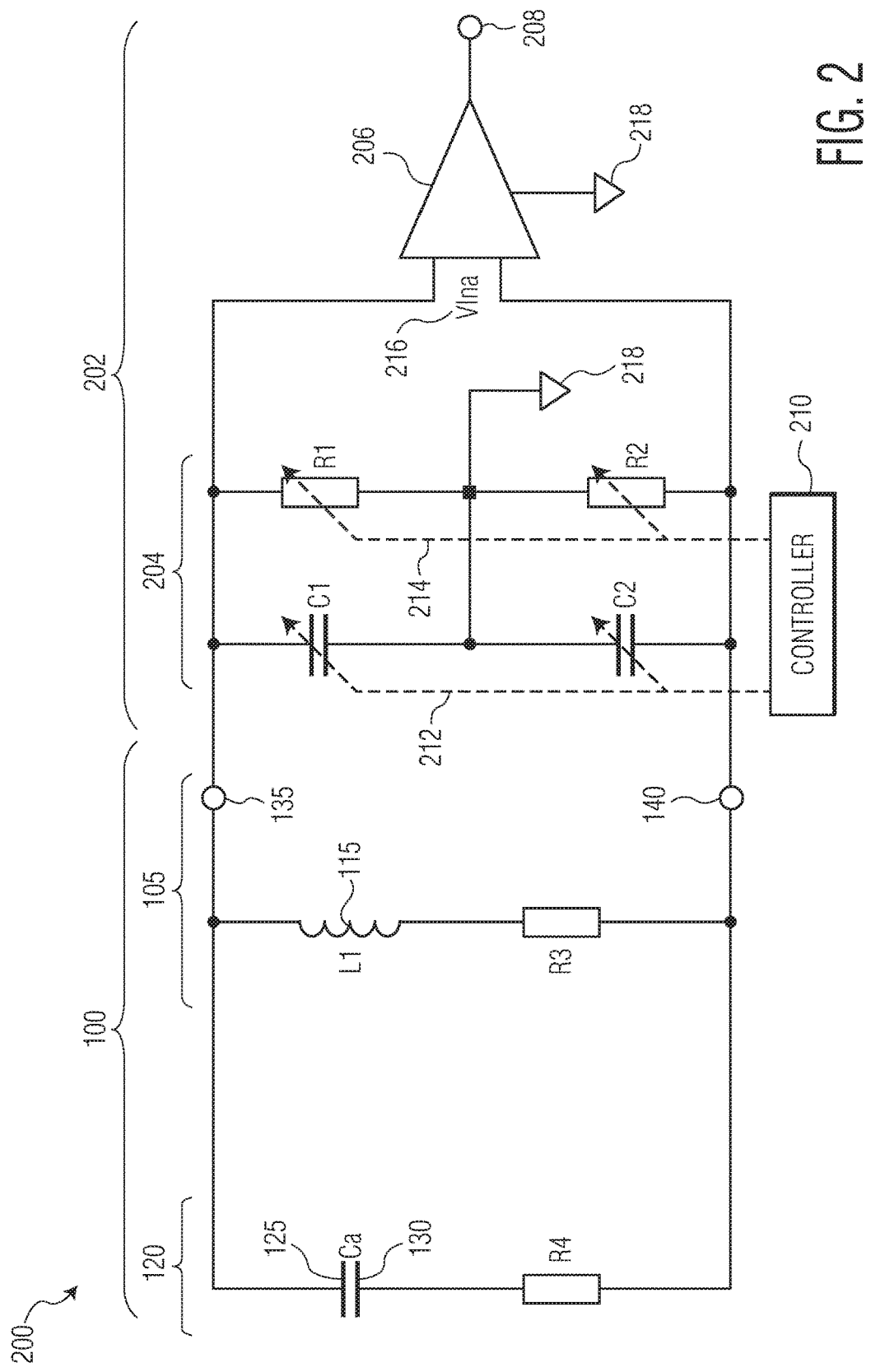
FIG. 2 is an example idealized electrical equivalent of a near-field device coupled to the near-field antenna and configured to receive a non-propagating quasi-static near-field signal.

FIG. 2 is an example 200 idealized electrical equivalent of a near-field device 202 coupled to the near-field antenna 100 and configured to receive (e.g. in a receive mode) a non-propagating quasi-static near-field signal.

The example idealized antenna 100 includes an H-field antenna 105 having a resistance (R3) and an inductance (L1), an E-field antenna 120 having a conductive structure formed from the two loading plates 125 and 130, and the two feeding points 135, 140.

The near-field device 202 includes a tuning circuit 204, an LNA 206 (low noise amplifier), a communications signal interface 208, and a controller 210.

The tuning circuit 204 is coupled to the first and second feed points 135, 140. The tuning circuit 204 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 218 (e.g. a ground potential). The capacitive banks are coupled to the controller 210 by control line 212, and the resistance banks are coupled to the controller 210 by control line 214.

The controller 210 adjusts the first and second capacitance banks (C1), (C2) to adjust a resonant frequency of the magnetic 105 and the electric 120 antennas (e.g. to 10.6 MHz). The controller 210 adjusts the first and second resistance banks (R1), (R2) to adjust a bandwidth of the magnetic 105 and the electric 120 antennas (e.g. to 400 KHz) sufficient to allow the non-propagating quasi-static near-field signal to be received from the antennas 105, 120.

In this example 200, the capacitance banks (C1), (C2) are equally tuned using the control line 212 from the controller 210, and the resistance banks (R1), (R2) are equally tuned using the control line 214 from the controller 210.

An LNA 206 (low noise amplifier) is coupled between the tuning circuit 204 and a communications signal interface 208. When the antenna 100 and device 202 are receiving the non-propagating quasi-static near-field signal, induced voltage 216 (Vlna) is present across the LNA 206 differential inputs. The LNA 206 amplifies the received near-field signal which is then further processed by additional radio/RFIC/baseband circuits (not shown) coupled to the communications signal interface 208. The LNA 206 is also coupled to the reference potential 218.

Since both inputs to the LNA 206 are coupled to the antennas 105, 120 this near-field device configuration is said to be balanced. The balanced circuit configuration helps reject interference signals that enter both LNA 206 input lines with the same amplitude and phase. In other examples an unbalanced device 202 can be used.

Figure 3:
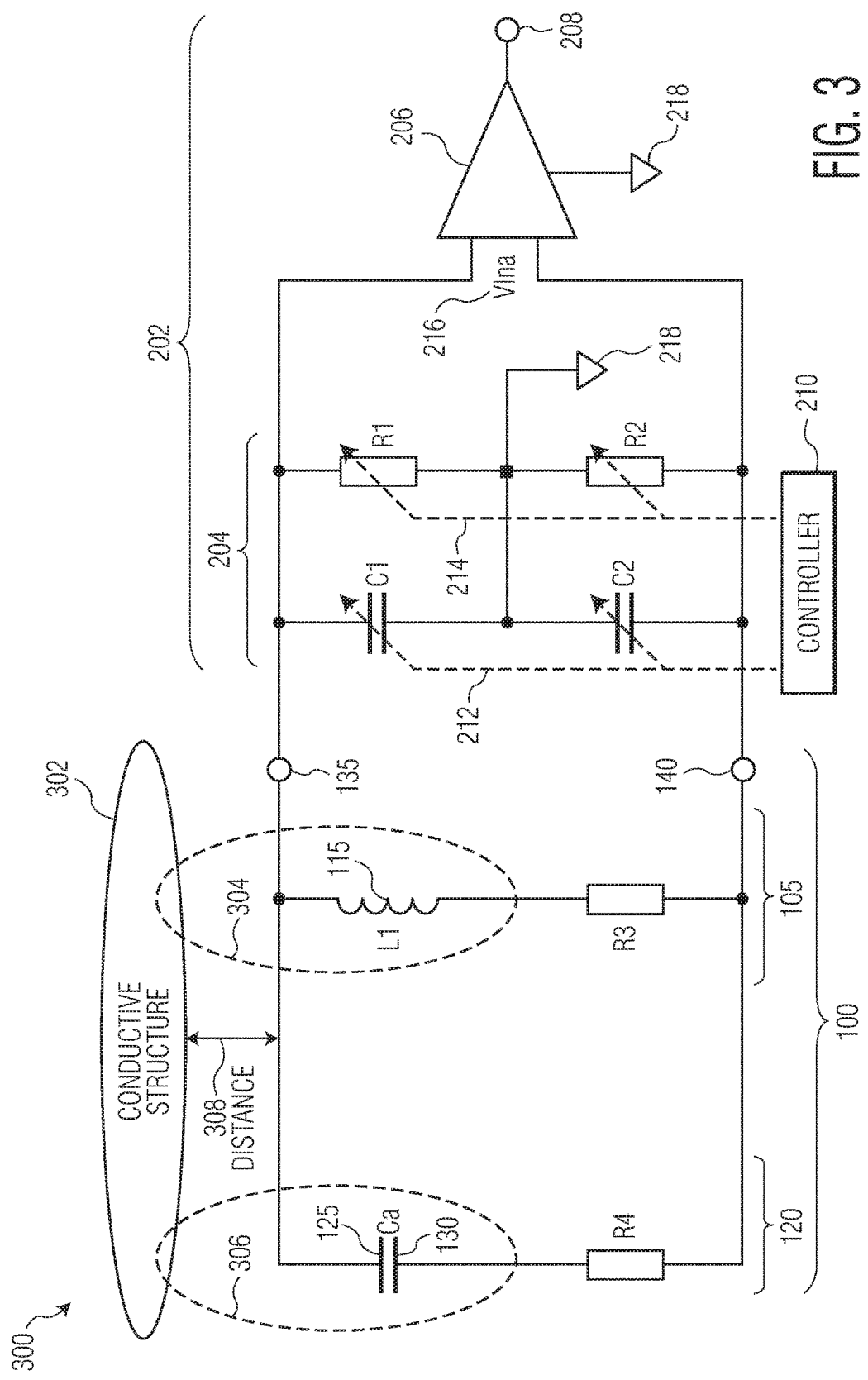
FIG. 3 is an example embodiment idealized electrical equivalent of the near-field device and the near-field antenna and proximate to a magnetically and/or electrically conductive structure.

FIG. 3 is an example 300 embodiment idealized electrical equivalent of the near-field device 202 and the near-field antenna 100 and proximate to a magnetically and/or electrically conductive structure 302.

The device 202 and antenna 100 in various examples can be embedded in a personal and/or wearable device (e.g. a hearing aid, an earbud, a smartwatch, a smartphone, a medical monitoring device, etc.). The conductive structure 302 can include: a body part, a circuit board, a door frame, a handle, or a kiosk. The conductive structure 302 can also be embedded in the personal and/or wearable device described above or additionally embedded in: a Pay terminal, an Industrial machine, a Clinical Medical device, a Personal Health device, a Food container, Kitchen equipment, a Home automation device, a Vehicle steering wheel, and/or a Vehicle seat or dashboard.

The E-field antenna 120 has a near-field (E) coupling 306 to the conductive structure 302. The H-field antenna 105 has a near-field (H) coupling 304 to the conductive structure 302.

The near field coupling depends upon a distance 308 between the antenna 100 and the conductive structure 302. The distance 308 can range from about 1 mm to significantly greater distances 308 depending upon the application. In a first example, if the antenna 100 and device 202 are embedded in a medical sensor on a user's body and the medical sensor and body will be about 1 mm apart. The body is the conductive structure 302.

In a second example, if the antenna 100 and device 202 are embedded in a smartwatch on a user's wrist and the smartwatch and wrist will be about 10 mm apart. Here again the user's wrist and body are the conductive structure 302; however, if the user is at the same time grasping a door handle, the conductive structure 302 includes both the body and door handle since the body and door handle would then be galvanically coupled.

300 mm is about the limit for a typical near-field (H) coupling 304 through air; however, even greater distances 308 are possible for near-field (E) coupling 306 along a conducting surface.

Figure 4:
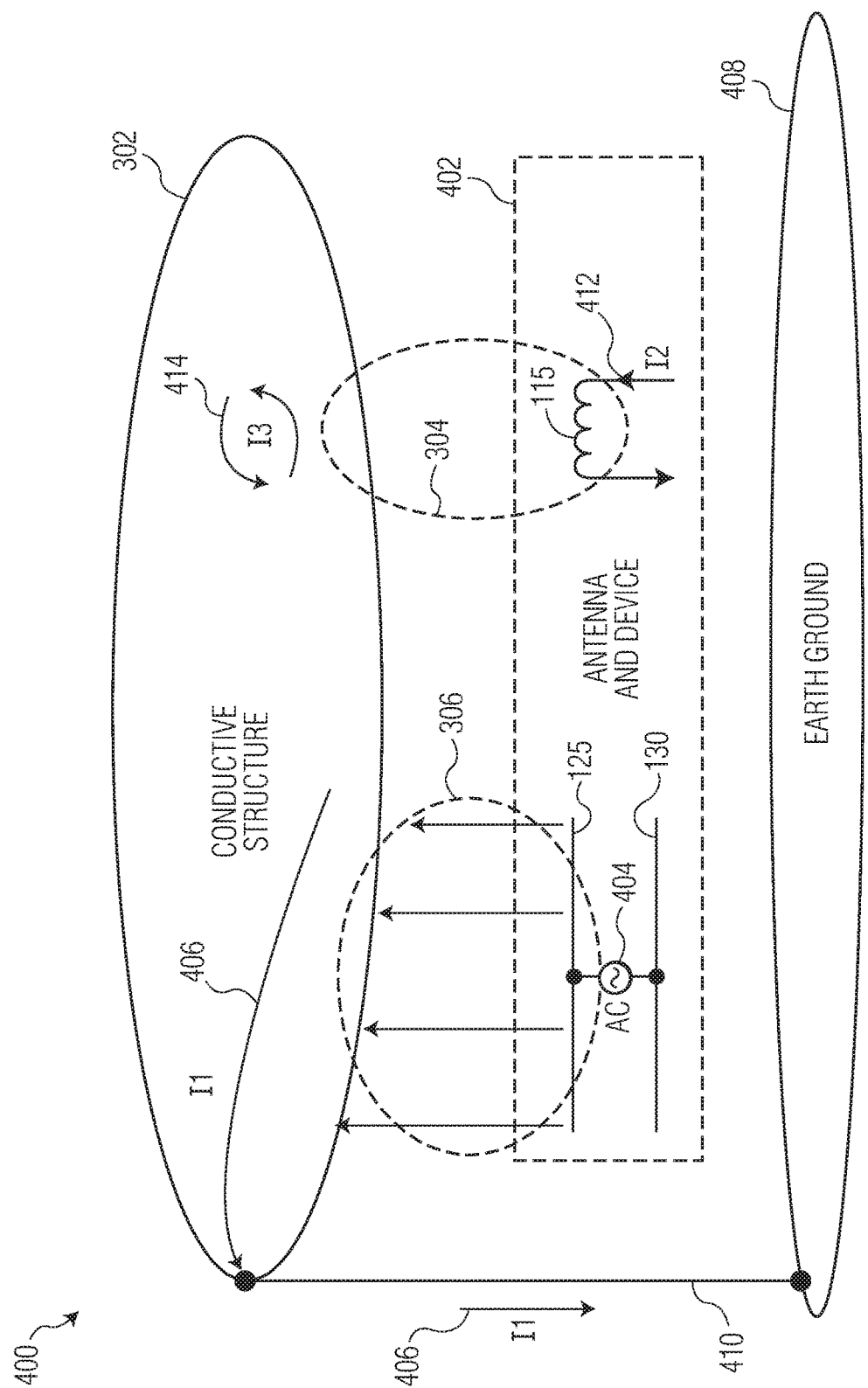
FIG. 4 is an example embodiment idealized near-field signal representation between a combination of the near-field device and the near-field antenna and proximate to the magnetically and/or electrically conductive structure.

FIG. 4 is an example 400 embodiment idealized near-field signal representation between a combination 402 of the near-field device 202 and the near-field antenna 100 and proximate to the magnetically and/or electrically conductive structure 302. The near-field (H) coupling 304 and near-field (E) coupling 306 between the antenna 100 and the conductive structure 302 are shown.

During a transmission mode, the device 202 generates a voltage 404 across the capacitive plates 125 and 130 of the E-field antenna 120 creates the near-field (E) coupling 306 between the E-field antenna 120 and the conductive structure 302.

The near-field (E) coupling 306 induces a current (I1) 406 in the conductive structure 302 which returns to an earth ground 408 to which the conductive structure 302 is galvanically coupled 410. For example, this could be a person (i.e. conductive structure 302) standing on (i.e. galvanically coupled 410) a floor (i.e. earth ground 408) while wearing a smartwatch (i.e. into which the antenna 100 and device 202 combination 402 is embedded).

Also during a transmission mode, the device 202 generates a current (I2) 412 through the wire coil 115 of the H-field antenna 105 creating the near-field (H) coupling 304 between the H-field antenna 105 and the conductive structure 302. The near-field (H) coupling 304 induces eddy currents (I3) 414 in the conductive structure 302 opposite to current (I2) 412.

The near-field (H) coupling 304 and the near-field (E) coupling 306 effectively make the conductive structure 302 part of the antenna 100 and device 202 circuit combination 402. Thus the conductive structure 302 and its distance 308 from the circuit combination 402 affects the resonance frequency, bandwidth, and quality factor of the antenna 100 and device 202 circuit combination 402.

In some example embodiments, the near-field (E) coupling 306 mainly affects the resonance frequency and the quality factor, and the near-field (H) coupling 304 mainly affects the quality factor.

Since the controller 210 uses the control lines 212, 214 to tune the resonance frequency and bandwidth of the near-field antenna 100, changes in this tuning provides information on the proximity of the antenna 100 and device 202 circuit combination 402 to various conductive structures (e.g. conductive structure 302) over time. The controller 210 in some example embodiments can retune the combination 402 every ten milliseconds (10 ms) which in many contexts is faster than a user or many structures could move.

Specific conductive structures will have a specific and repeatable effect on the controller's 210 tuning operations (e.g. resonance, bandwidth, quality factor, etc.). Such specific and repeatable effects in some example embodiments can be stored in a memory and later mapped to one or more of the following:

- a static physical position of the combination 402 relative to one or more conductive structures 302 (e.g. a user's body, a vehicle, an office, a parcel, etc.).
- a varying physical position of the combination 402 relative to one or more conductive structures 302 (e.g. monitoring a user's exercise, steps, etc.).
- granting security access to a user (e.g. first conductive structure 302) at an access control conductive structure (e.g. second conductive structure 302 such as a doorway, an information device, or a transportation or banking service) based on a set of expected resonance, bandwidth, and/or quality factor changes.
- identity verification of the combination 402 with one or more specific conductive structures 302 (e.g. a specific user touching a door handle, shaking hands, requesting a good or service, etc.).
- seating, counting, manufacturing, or assembly operations that require that one or more conductive structures 302 be in a particular arrangement with respect to each other or with respect to other conductive structures (e.g. all airplane passengers sitting down and buckled up before takeoff, all parts in a particular arrangement before bonding, etc.).

Thus by cataloging, in a memory storage, sets of specific and repeatable effects of the antenna 100 and device's 202 relationship to the conductive structure 302, the controller 210 can respond with a specific set of actions (e.g. enable or disable the device 202 or another device, unlock a door, pay a fare, transmit a message, provide and/or receive user and/or environmental data, and/or confirm an identity. Additional applications and embodiments are discussed throughout this specification.

Such sets of specific and repeatable effects can also provide a user more context awareness and to more seamlessly move through various environments and selectively control various devices in such environments.

For example, when the antenna 100 and device 202 combination 402 are implemented in a smartwatch, a resonance frequency of 10.6 MHz and bandwidth of 400 KHz may be required for effective near-field communications. If the smartwatch is not on a user's wrist (i.e. conductive structure 302) the controller 210 may tune the variable capacitor banks to 130 pF and tune the variable resistor banks to 5000 Ohms. However, once the user places the smartwatch on their wrist the controller 210 will retune the capacitance banks and resistance banks so as to maintain the required resonance frequency and bandwidth. Real world test cases have yielded capacitance bank values in the range of 115 pF and resistance bank values in the range of 3750 Ohms.

In some example embodiments, the controller 210 may be set to retune the banks every 10 milliseconds to account for user movements (i.e. changes in the distance 308) while wearing the smartwatch.

In an example smartwatch application of the combination 402, the device 202 can both detect that the smartwatch is worn by a particular user and if the smartwatch is close enough to the user's wrist for establishing robust near-field communication. The controller 210 can be configured to collect data of the variable capacitance banks and resistance banks. A first tuning set can be collected with a user first purchases the smartwatch. Other sets can be collected during smartwatch operation to ensure proper use of the smartwatch. With the collected data the controller can compare the tuning data to a correct positioning of the smartwatch and the user can be instructed to reposition the smartwatch for better near-field communication (e.g. a warning can be transmitted to a user interface so that the user corrects the positions of the smartwatch, such as if the smartwatch wristband is too loose).

In an example security-focused application of the combination 402, a user wearing the smartwatch with the embedded combination 402 touches a door handle which unlocks the door based on an expected set of capacitance and resistance bank values. Additional near-field signals can also be transmitted through the door handle and contain encryption data.

In an example transportation application of the combination 402, permits or denies entry to a train or bus system in response to a user touching a sensor on the train or bus while the user is wearing the smartwatch with the embedded combination 402.

In an example biometric authentication application, remote patient care can be provided, perhaps helping to ensure the right patient (e.g. identity application) receives the right drug (e.g. safety application) and that various sensors (e.g. a glucose or insulin sensor) are properly worn (e.g. a data integrity application). The combination 402 discussed above in a biometric authentication application can even help verifying the identity of two users by shaking hands.

Operation of the controller 210 as discussed above can in various example embodiments include fixed circuitry, logic gates, an FPGA, and/or instructions stored in memory and executed by a processor. The controller 210 can also include an input/output data interface. The operational instruction can in some example embodiments be stored in a non-transient machine-readable storage medium. The machine-readable storage medium would include the instructions which control how the processor receives input data and transforms the input data into output data, using data within the storage device.

Operation of the controller 210 can be executed in any order, unless a specific order is explicitly stated. Also, those skilled in the art will recognize that while one example set of operations have been discussed, the material in this specification can be combined in a variety of ways to yield other examples as well, and are to be understood within a context provided by this detailed description.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and

What is claimed is:

1. A near-field device, configured to receive a non-propagating quasi-static near-field signal from a near-field antenna, comprising:
   a tuning circuit including a set of impedance tuning banks; and
   a controller configured to,
      identify a set of impedance values for the impedance tuning banks corresponding to an initial resonance frequency, bandwidth and/or quality factor of the near-field antenna and near-field device combination;
      detect a change in the resonance frequency, bandwidth and/or quality factor;
      access a pre-stored set of specific resonance frequency, bandwidth and/or quality factor changes corresponding to a set of specific conductive structures;
      identify a conductive structure from the set of conductive structures corresponding to the detected change;
      access a pre-stored set of specific near-field device actions corresponding to the set of conductive structures; and
      effect a set of specific actions from the set of near-field device actions corresponding to the identified conductive structure.

2. The device of claim 1:
   further comprising, adjusting the impedance tuning banks to a new set of impedance values that place the near-field antenna and near-field device combination back to the initial resonance frequency, bandwidth and/or quality factor values; and
   wherein the change in the resonance frequency, bandwidth and/or quality factor is defined as the new set of impedance values.

3. The device of claim 1:
   wherein the set of impedances are capacitances.

4. The device of claim 1:
   wherein the set of impedances are resistances.

5. The device of claim 1:
   wherein the conductive structure is a magnetically conductive structure.

6. The device of claim 1:
   wherein the conductive structure is an electrically conductive structure.

7. The device of claim 1:
   wherein the device includes the conductive structure;
   wherein the conductive structure is a first conductive structure; and
   wherein the first conductive structure is galvanically connectable to a second conductive structure.

8. The device of claim 1:
   wherein the conductive structure is or is embedded in at least one of: a human body, a wearable device, an internet of things device, a biometric device, a building structure, a safe, a pay terminal, an industrial machine, a clinical medical device, a personal health device, a food container, kitchen equipment, a home automation device, a vehicle steering wheel, and/or a vehicle seat or dashboard.

9. The device of claim 1:
   wherein the near-field device is a near-field electromagnetic induction (NFEMI) device; and
   wherein the near-field antenna is a near-field electromagnetic induction (NFEMI) antenna.

10. The device of claim 1:
    wherein the near-field antenna and near-field device combination is configured to be less than 10 mm from the conductive structure.

11. The device of claim 1:
    wherein the change corresponds to a static physical position of the combination with respect to the conductive structure; and
    wherein the set of specific actions include, outputting a request that the physical position be changed.

12. The device of claim 1:
    wherein the change corresponds to a varying physical position of the combination with respect to the conductive structure; and
    wherein the set of specific actions include, outputting a physical position variance rate, duration, and/or variance range.

13. The device of claim 1:
    wherein the change corresponds to contact with an access control conductive structure; and
    wherein the set of specific actions include, providing access to at least one of: a building, a service, or information.

14. The device of claim 1:
    wherein the change corresponds to a specific person's biometric signature with respect to the conductive structure; and
    wherein the set of specific actions include, user identification, providing a good, or providing a service.

15. The device of claim 1:
    wherein the change corresponds to a specific positioning of the conductive structure with respect to a set of additional conductive structures.

16. The device of claim 1:
    wherein the device is embedded in at least one of: a wearable device, a hearing aid, an earbud, a smartwatch, a smartphone, or a medical monitoring device.

17. A method of enabling a near-field device, that is configured to receive a non-propagating quasi-static near-field signal from a near-field antenna, to be operated, comprising:
    distributing a set of instructions, stored on a non-transitory, tangible computer readable storage medium, for configuring the near-field device;
    wherein the instructions include,
       identifying a set of impedance values for a set of impedance tuning banks corresponding to an initial resonance frequency, bandwidth and/or quality factor of the near-field antenna and near-field device combination;
       detecting a change in the resonance frequency, bandwidth and/or quality factor;
       accessing a pre-stored set of specific resonance frequency, bandwidth and/or quality factor changes corresponding to a set of specific conductive structures;
       identifying a conductive structure from the set of conductive structures corresponding to the detected change;
       accessing a pre-stored set of specific near-field device actions corresponding to the set of conductive structures; and
       effecting a set of specific actions from the set of near-field device actions corresponding to the identified conductive structure.

* * * * *